(12) United States Patent
Lemmer

(10) Patent No.: US 12,445,082 B2
(45) Date of Patent: Oct. 14, 2025

(54) CONTROL DEVICE AND METHOD FOR OPERATING AN ELECTRIC MOTOR, IN PARTICULAR OF A STEERING SYSTEM

(71) Applicant: Robert Bosch GmbH, Stuttgart (DE)

(72) Inventor: Paul Lemmer, Goeggingen (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 18/323,057

(22) Filed: May 24, 2023

(65) Prior Publication Data

US 2023/0387847 A1 Nov. 30, 2023

(30) Foreign Application Priority Data

May 25, 2022 (DE) ..................... 10 2022 205 268.4

(51) Int. Cl.
*H02P 29/028* (2016.01)
*B62D 5/04* (2006.01)

(52) U.S. Cl.
CPC .......... *H02P 29/028* (2013.01); *B62D 5/0421* (2013.01); *B62D 5/0487* (2013.01)

(58) Field of Classification Search
CPC ... H02P 29/028; B62D 5/0487; B62D 5/0421; B62D 5/0484; B62D 5/046; H02J 7/1492; H02J 7/0024; H02J 7/02; H02J 7/0025; H02J 7/49; B60L 50/51; H02M 7/4835
See application file for complete search history.

(56) References Cited

U.S. PATENT DOCUMENTS

2025/0038693 A1* 1/2025 Funakoshi ................ H02P 6/12

FOREIGN PATENT DOCUMENTS

DE 10 2021 211 208 A1 4/2023

* cited by examiner

*Primary Examiner* — Said Bouziane
(74) *Attorney, Agent, or Firm* — Maginot, Moore & Beck LLP

(57) ABSTRACT

A control device for operating an electric motor, in particular a steering system, includes a power electronics, a primary driver unit provided for actuating the power electronics in a normal operating state, and a secondary driver unit connected in parallel to the primary driver unit and provided for actuating the power electronics in at least one fault operating state in which a malfunction and/or failure of the primary driver unit occurs. The secondary driver unit comprises a power source having an adjustable current strength for controlling a switching state of at least one circuit breaker of the power electronics. An absolute value of the power source in the normal operating state is set to a first value which is below a first limit value, and in the at least one fault operating state it is set to a second value which is above a second limit value.

11 Claims, 2 Drawing Sheets

CONTROL DEVICE AND METHOD FOR OPERATING AN ELECTRIC MOTOR, IN PARTICULAR OF A STEERING SYSTEM

This application claims priority under 35 U.S.C. § 119 to patent application no. DE 10 2022 205 268.4, filed on May 25, 2022 in Germany, the disclosure of which is incorporated herein by reference in its entirety.

BACKGROUND

The disclosure relates to a control device for operating an electric motor, in particular of a steering system, as well as a method for operating an electric motor, in particular by means of such a control device. In addition, the disclosure relates to an actuator assembly having such a control device, as well as a steering system having such an actuator assembly.

From the prior art, control devices for operating electric motors with a plurality of driver units in the form of half bridge drivers and/or gate drivers are known, wherein the driver units can be provided for actuating different power electronics or a single power electronics. In the latter case, for example, the driver units can serve to meet redundancy specifications, so that even in the event of a fault, an actuation of the power electronics can be achieved and consequently operation of the electric motor can be maintained. However, if the driver units are switched in parallel and provided in order to actuate the same power electronics, then a current flow from the primary and/or active driver unit into the secondary and/or passive driver unit must be prevented or at least reduced in operation. In known control devices, additional switches and/or resistors are used for this purpose, for example. However, these known capabilities result in reduced power efficiency and additional overhead as well as additional costs.

In addition, a generic control device as well as a generic method are known from the subsequently published DE 10 2021 211 208 A1.

Proceeding from the above, the problem addressed by the disclosure is in particular to provide a control device as well as a method for operating an electric motor with improved properties in terms of operational safety. The problem is solved by the features disclosed herein.

SUMMARY

The disclosure proceeds from a control device for operating an electric motor, in particular a steering system, having a power electronics, having a primary driver unit which is provided for actuating the power electronics in a normal operating state, and having a secondary driver unit connected in parallel to the primary driver unit which is provided for actuating the power electronics in at least one fault operating state in which a malfunction and/or failure of the primary driver unit occurs.

It is proposed that the secondary driver unit comprise an in particular integrated power source having an adjustable current strength for controlling a switching state of at least one circuit breaker of the power electronics, wherein an absolute value of the power source in the normal operating state is set to a first value which is below a first limit value, and in the fault operating state it is set to a second value which is above a second limit value. In particular, the first limit value is less than or equal to the second limit value. In addition, the second limit value is selected as a function of the switching state of the at least one circuit breaker, in particular such that a switching state of the circuit breaker can be changed by the secondary driver unit in the fault operating state. The first limit value and the second limit value are further configured in particular as amplitude limit values. Furthermore, the primary driver unit is in an active state when in the normal operating state. Thus, in the present case, in the normal operating state, the primary driver unit is active and the secondary driver unit is passive and/or inactive. In the present case, the secondary driver unit is intended to replace the primary driver unit in the fault operating state. In the fault operating state, the secondary driver unit is in particular activatable by changing the current strength of the power source and/or transferable into an active state such that the secondary driver unit is in an active state when in the fault operating state. Thus, in the fault operating state, the primary driver unit is passive and/or inactive and the secondary driver unit is active. With this configuration, an efficiency, in particular a power efficiency, control efficiency, energy efficiency, space efficiency, component efficiency, and/or cost efficiency can be improved. In addition, a computational effort in particular can be minimized and/or a control algorithm can be simplified.

In this context, a "control device" is to be understood to mean at least one part, in particular a sub-assembly, an actuator assembly, and advantageously a steering system, which is provided in at least one operating state for controlling the operation of at least one electric motor of the actuator assembly. The electric motor is in particular configured as a servo motor, advantageously as a brushless motor, and particularly advantageously as an asynchronous motor or as a permanently excited synchronous motor. Preferably, the electric motor is provided as part of an auxiliary electric power steering and in particular for generating an electric steering assistance. The electric motor can be configured as a three-phase, six-phase, nine-phase, or twelve-phase electric motor, for example. In addition, the power electronics are configured as an inverter unit, in particular as an output stage and/or as a bridge circuit, and are provided for powering and/or energizing the electric motor. In particular, the power electronics comprise a plurality of circuit breakers, preferably configured as field effect transistors, for example in the form of MOSFETs.

Furthermore, a "driver unit" is to be understood as an at least semi-electrically and/or electronically configured unit that is electrically connected to the power electronics, in particular a control terminal of at least one power switch of the power electronics, and is intended to control the at least one power switch and in particular to provide a control voltage and/or a control current for the at least one power switch. Preferably, the driver unit is provided in order to control all circuit breakers of the power electronics. Advantageously, the driver unit is configured as a half bridge driver and/or gate driver. Furthermore, the primary driver unit is advantageously configured as a master driver unit, while the secondary driver unit is configured as a slave driver unit. The primary driver unit and the secondary driver unit are redundant to one another and preferably identical in design. Particularly advantageously, the primary driver unit and/or the secondary driver unit is configured as integrated electronic circuit. Advantageously, the primary driver unit is provided in order to adjust a motor torque of the electric motor in the normal operating state, in particular by actuating the power electronics, and preferably a support torque of the electric motor. The secondary driver unit is operatively connected to the primary driver unit and is particularly intended to replace the primary driver unit in the fault operating state and to actuate the power electronics and consequently take control of operation of the electric motor. Advantageously, the primary driver unit in the normal operating state and the secondary driver unit in the fault operating state are provided in order to use at least partially the same and/or identical, in particular existing, assemblies and connection lines so as to actuate the power electronics and in particular to actuate the same circuit breakers and consequently to operate the same phases of the electric motor. Furthermore, the primary driver unit and the secondary driver unit can be operated independently from one another. In particular, the primary driver unit is provided in order to actuate the power electronics exclusively in the normal operating state and thereby change and/or vary a motor torque of the electric motor, preferably a support torque of the electric motor. In addition, the secondary driver unit is advantageously provided in order to actuate the power electronics exclusively in the fault operating state and thereby change and/or vary a motor torque of the electric motor, preferably a support torque of the electric motor. In particular, it should be understood that "a driver unit has a power source having an adjustable current strength" means that a current value provided by the power source or the driver unit can be changed, preferably by software technology or by means of a corresponding actuation, so that a current strength and/or a current level of the driver unit is adjustable. The power source is electrically connected to an output of the driver unit, in particular to the power electronics, such that an output signal of the driver unit, which is in particular forwarded to the power electronics, can be changed by changing the current strength. As a result, the output of the driver unit can assume at least two different states, wherein a first state corresponds to an active state and a second state corresponds to an inactive state. The phrase "a driver unit has an integrated power source" is intended in particular to mean that the power source is configured as a structural unit, for example as an integrated electronic circuit, together with other components of the driver unit, for example an actuation electronics. In this case, the power source is in particular not realized via an external circuitry. Moreover, "a malfunction and/or failure of the primary driver unit" is to be understood to mean, in particular, a malfunction and/or failure of the primary driver unit itself and/or of a periphery assembly cooperating with the primary driver unit, such as a power supply, and a malfunction of the primary driver unit caused thereby. The term "provided" is in particular intended to mean specifically programmed, designed, and/or equipped. The phrase "an object being provided for a specific function" is particular intended to mean that the object fulfills and/or performs this specific function in at least one application and/or operating state.

Furthermore, it is proposed that the power source, in particular in the fault operating state, is provided in order to provide a positive current value for switching on and/or closing the at least one circuit breaker and a negative current value for switching off and/or opening the at least one circuit breaker. Accordingly, the power source is provided in order to generate a current flow towards the control terminal of the circuit breaker in order to switch on and/or close the at least one circuit breaker and to switch off and/or open the at least one circuit breaker in order to generate a current flow in a direction opposite to the direction. Preferably, in this case, the at least one circuit breaker is configured as a field effect transistor, wherein a capacitor of the field effect transistor is charged with positive current and negative current is discharged. Advantageously simple control can in particular be achieved as a result.

In addition, it is proposed that the first limit value be at most 10 mA, preferably at most 1 mA, and particularly preferably at most 0.1 mA, and/or that the second limit value be at least 100 mA, preferably at least 300 mA, and particularly preferably at least 500 mA. The first limit value and the second limit value are in particular related to the peak currents. A particularly safe actuation of the power electronics with defined switching states can thereby be achieved.

According to a particularly preferred embodiment of the disclosure, it is proposed that the primary driver unit comprise a further, in particular integrated, power source with an adjustable current for controlling a switching state of at least one circuit breaker of the power electronics, in particular the circuit breaker previously mentioned. Preferably, an absolute value of the further power source in the normal operating state is set to a third value, which is above the second limit value. In the fault operating state, on the other hand, the further power source can be deactivated, or an absolute value of the further power source can be set to a fourth value that is below the first limit value. The third value and the fourth value can deviate from the first value and the second value. Preferably, however, the third value is identical to the second value and/or the fourth value is identical to the first value. Moreover, the further power source, in particular in the normal operating state, is provided in order to provide a positive current value for switching on and/or closing the at least one circuit breaker and a negative current value for switching off and/or opening the at least one circuit breaker. Accordingly, the further power source is provided in order to generate a current flow towards the control terminal of the circuit breaker in order to switch on and/or close the at least one circuit breaker and to switch off and/or open the at least one circuit breaker in a direction opposite to the direction. As a result, an advantageously symmetrical structure can be realized with the same components, whereby a cost efficiency can be improved. In addition, additional breakers or other measures for disconnecting the primary driver unit in the fault operating state can be omitted.

It is further proposed that the control device comprise a primary computing unit for actuating the primary driver unit and a secondary computing unit that is in particular redundant to the primary computing unit for actuating the secondary driver unit. The term "computing unit" is in particular intended to mean an electrical and/or electronic unit which comprises an information input, an information processor, and an information output. Advantageously, the computing unit further comprises at least one processor, for example in the form of a microprocessor, at least one operational memory, at least one input and/or output means, and at least one operating program. The primary computing unit is further electrically connected to the primary driver unit and is provided in order to provide a primary actuation signal for actuating the primary driver unit. The secondary computing unit is electrically connected to the secondary driver unit and is provided in order to provide a secondary actuation signal for actuating the secondary driver unit. In addition, the primary computing unit is preferably free of electrical connection to the secondary driver unit, while the secondary computing unit is advantageously free of electrical connection to the primary driver unit. As a result, advantageously simply constructed, redundant control logic can be provided.

Preferably, the control device further comprises a switching logic, which is electrically connected to the primary driver unit and the secondary driver unit and is provided in order to provide a control signal for enabling operation of the primary driver unit or the secondary driver unit as a function of a signal of the primary computing unit that is in particular different than the primary actuation signal and a signal of the secondary computing unit that is in particular different than the secondary actuation signal. Accordingly, the switching logic is provided in order to enable operation of the primary driver unit and/or the secondary driver unit by means of the at least one control signal. Preferably, the switching logic is provided in order to provide a separate control signal for each driver unit. Particularly preferably, the switching logic is also provided for preventing simultaneous operation of the primary driver unit and the secondary driver unit, in particular by means of software or hardware means. This can in particular increase an operational reliability.

Furthermore, it is proposed that the switching logic be provided in order to account for at least one monitoring signal of a watchdog unit when generating the control signal(s). Particularly preferably, the switching logic is provided in order to account for at least one primary monitoring signal of a primary watchdog unit and a secondary monitoring signal of a secondary watchdog unit that is in particular redundant to the primary watchdog unit when generating the control signal. In particular, the control device can comprise the watchdog unit or the primary watchdog unit and the secondary watchdog unit. This can increase an operational reliability.

For example, the switching logic can be configured as an integrated circuit or can be integrated into the driver units. However, a particularly flexible device can be achieved when the switching logic is configured as a discrete circuit.

In addition, the disclosure relates to an actuator assembly having an electric motor, in particular the aforementioned electric motor, and to the aforementioned control device. Particularly preferably, the control device and the electric motor are part of a steering system, which is in particular provided for use in a vehicle, and preferably a motor vehicle.

In addition, a method for operating an electric motor, in particular by means of a control device, is proposed, in which, in a normal operating state, a power electronics is actuated by means of a primary driver unit and, in a fault operating state in which a malfunction and/or failure of the primary driver unit occurs, the same is actuated by a secondary driver unit connected in parallel to the primary driver unit, wherein the secondary driver unit comprises an in particular integrated power source having an adjustable current strength for controlling a switching state of at least one circuit breaker of the power electronics, wherein an absolute value of the power source in the normal operating state is set to a first value which is below a first limit value, and in the fault operating state it is set to a second value which is above a second limit value. This can achieve the aforementioned advantages. In particular, an efficiency, in particular a power efficiency, control efficiency, energy efficiency, space efficiency, component efficiency, and/or cost efficiency can be improved. In addition, a computational effort in particular can be minimized and/or a control algorithm can be simplified.

The control device, actuator assembly, steering system, and method are not intended to be limited to the application and embodiment described above. In order to carry out a function described herein, the control device, actuator assembly, steering system, and method can in particular comprise a number of individual elements, components, and units that differs from a number specified here.

BRIEF DESCRIPTION OF THE DRAWINGS

Further advantages will become apparent from the description of the drawings hereinafter. The drawings illustrate an exemplary embodiment of the disclosure.

Shown are.

DETAILED DESCRIPTION

The following embodiment relates, by way of example, to a steering system. However, in principle, the disclosure is not limited to use in a steering system and could also be used in other areas of a vehicle, for example a wiping system, a window regulator system, and/or a drive system, and/or in other electronic systems, for example in the area of household appliances and/or machine tools.

Figure 1:
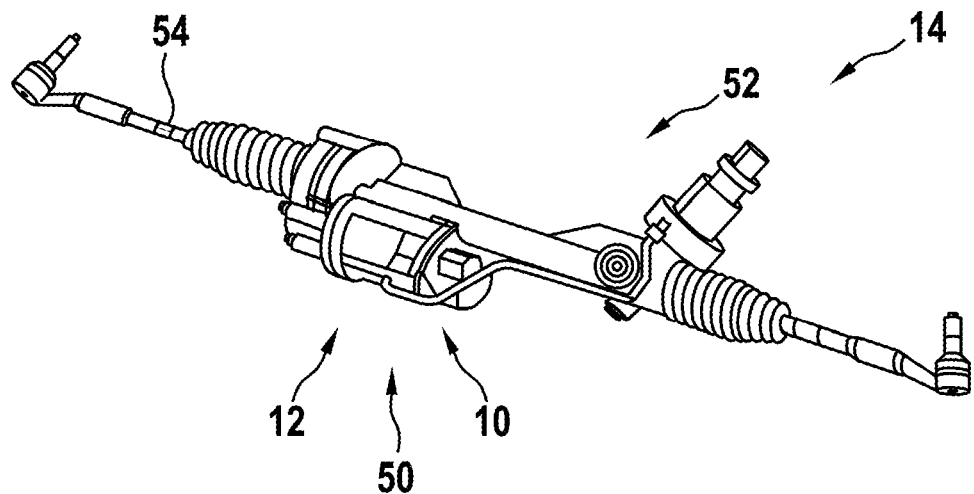
FIG. 1 a portion of an exemplary steering system with an actuator assembly comprising an electric motor and a control device in a perspective view, FIG. 2 the control device and the electric motor in a schematic diagram, FIG. 3 a driver unit of the control device and a circuit breaker of a power electronics of the control device in a detailed view, and FIG. 4 an exemplary flowchart showing the main method steps of a method for operating the electric motor.

FIG. 1 shows at least a portion of an exemplary steering system 14 in a perspective view. In the present case, the steering system 14 is configured as an electrically assisted steering system. The steering system 14 is configured by way of example as a conventional steering system and comprises an auxiliary electric steering in the form of a power steering. Furthermore, the steering system 14 is provided for use in a vehicle (not shown), in particular a motor vehicle. In an installed state, the steering system 14 is operatively connected to the vehicle wheels (not shown), and is provided in order to influence a direction of travel of the vehicle. Alternatively, however, it is also contemplated to configure a steering system having an electrical superimposed steering and/or active steering. A steering system could furthermore in principle also be configured as a steer-by-wire steering system and/or as a rear axle steering. Moreover, a corresponding steering system could be provided for use in a commercial vehicle.

The steering system 14 comprises a steering gear 52, configured as a rack-type steering gear, for example, which is intended to convert a steering command into a steering movement of the vehicle wheels. To this end, the steering gear 52 comprises at least one steering control element 54, in the present case in particular configured as a rack.

The steering system 14 also comprises at least one actuator assembly 50. The actuator assembly 50 is configured as a steering actuator and is operatively connected to the steering actuator 54. The actuator assembly 50 is provided in order to provide a steering torque. In the present case, the actuator assembly 50 is provided in order to provide a steering torque in the form of a support torque and/or servo torque, and, in particular for steering assistance, to be introduced into the steering gear box 52. Alternatively, however, an actuator assembly could also be part of an electrical superimposed steering and/or active steering, and is in particular provided for providing an additional steering angle and/or variable gear ratio. Furthermore, an actuator assembly could be part of a steer-by-wire steering system. In this case, the actuator assembly could be particularly provided for use in a wheel steering angle adjuster and in particular to provide a steering torque for direct control of a direction of travel of a vehicle. In this case, the actuator assembly could also be provided for use in a control unit of the steer-by-wire steering system and for providing a feedback torque and/or resetting torque to a steering handling. Furthermore, as mentioned above, an actuator assembly could also be used independently of a steering system.

The actuator assembly 50 comprises an electric motor 12 which is known per se. The electric motor 12 is configured as a synchronous motor, in particular a permanently excited motor. The electric motor 12 is further configured as a multi-phase electric motor. In the present case, the electric motor 12 is configured by way of example as a three-phase electric motor. The electric motor 12 is operatively connected to the steering gear 52, in particular the steering control member 54. The electric motor 12 is provided in order to generate the steering torque. In the present case, the electric motor 12 is part of the auxiliary electric power steering and is in particular used in order to generate the electric steering assistance. In principle, however, an electric motor could also be configured as a six-phase or a twelve-phase electric motor.

Figure 2:
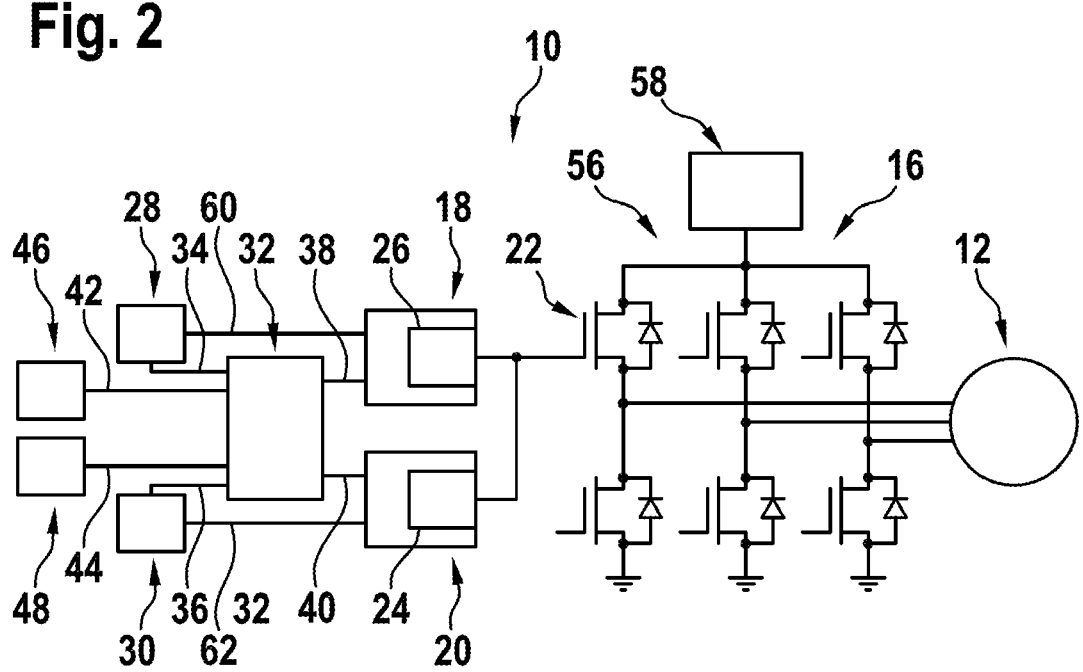

Furthermore, the actuator assembly 50 comprises a control device 10 (cf. in particular also FIG. 2). In the present case, control device 10 is configured as a control unit, in particular a steering control unit. The control device 10 is operatively connected to the electric motor 12 and is provided for controlling an operation of the electric motor 12.

The control device 10 comprises a primary computing unit 28. The computing unit 28 comprises at least one processor (not shown), for example in the form of a microprocessor. In addition, the primary computing unit 28 can comprise at least one operational memory (not shown). Furthermore, the primary computing unit 28 comprises at least one operational program stored in the operational memory with at least one primary calculation routine and at least one primary control routine.

Furthermore, the control device 10 comprises a power electronics 16 known per se. The power electronics 16 are operatively connected to the primary computing unit 28 and positioned downstream therefrom. In addition, the power electronics 16 are operatively connected to the electric motor 12. In the present case, the power electronics 16 are configured as an output stage, in particular as a B6 bridge circuit, and comprise a plurality of inverters 56, in particular identical to one another, wherein each phase of the electric motor 12 is associated with one of the inverters 56. Each of the inverters 56 comprises two circuit breakers 22, in particular identical to one another, in particular a high-side circuit breaker and a low-side circuit breaker. For clarity, only one of the inverters 56 and one of the circuit breakers 22 bears reference numerals in FIG. 2. Each of the inverters 56 is provided in order to convert a pulsating rectified voltage of a power source 58, for example in the form of a vehicle battery, into a phase current and to supply it to the electric motor 12, in particular precisely one phase of the electric motor 12.

Moreover, the control device 10 comprises a primary driver unit 18. The primary driver unit 18 is electrically connected to and is positioned downstream of the primary computing unit 28. The primary computing unit 28 is provided in order to provide a primary actuation signal 60 for actuating the primary driver unit 18. In addition, the primary driver unit 18 is electrically connected to the power electronics 16. Accordingly, the primary driver unit 18 is arranged between the primary computing unit 28 and the power electronics 16. The primary driver unit 18 is configured as an integrated electronic circuit. The primary driver unit 18 is configured as a half bridge driver and/or gate driver, in the present case in particular a triple half bridge driver. The primary driver unit 18 is provided in order to actuate at least one of the circuit breakers 22 and, in particular, to provide a control voltage and/or a control current for the at least one circuit breaker 22. In the present case, the primary driver unit 18 is provided by way of example to control all the circuit breakers 22 of the power electronics 16. In the present case, the primary driver unit 18 is provided together with the primary computing unit 28 at least in a normal operating state for actuating the power electronics 16.

Because the steering system 14 is a safety-relevant vehicle component with a direct impact on the driver and/or vehicle guidance, in a fault operating state in which a malfunction and/or failure of the primary driver unit 18 itself and/or a periphery assembly cooperating with the primary driver unit 18, such as a power supply, and a malfunction of the primary driver unit 18 caused thereby occurs, a corresponding safety concept is required.

For this reason, the control device 10 further comprises a secondary computing unit 30 as well as a secondary driver unit 20.

The secondary computing unit 30 is formed separately from the primary computing unit 28. The secondary computing unit 30 is redundant to the primary computing unit 28. Furthermore, the secondary computing unit 30 can be communicatively connected to the primary computing unit 28, for example, by way of a communication channel (not shown). The secondary computing unit 30 comprises at least one processor (not shown), e.g. in the form of a microprocessor. In addition, the secondary computing unit 30 can comprise at least one further operational memory (not shown). Furthermore, the secondary computing unit 30 comprises at least one further operating program stored in the further operational memory with at least one secondary calculation routine and at least one secondary control routine.

The secondary driver unit 20 is formed separately from the primary driver unit 18. The secondary driver unit 20 is configured redundantly to the primary driver unit 18. The secondary driver unit 20 is further configured identically to the primary driver unit 18. In principle, however, a primary driver unit and a secondary driver unit could also be configured differently from one another, in particular if the secondary driver unit is only provided for emergency operation. Furthermore, the secondary driver unit 20 is electrically connected to and is positioned downstream of the secondary computing unit 30. The secondary computing unit 30 is provided in order to provide a secondary actuation signal 62 for actuating the secondary driver unit 20. In addition, the secondary driver unit 20 is electrically connected to the power electronics 16. The secondary driver unit 20 is arranged between the secondary computing unit 30 and the power electronics 16. In the present case, the secondary driver unit 20 is accordingly switched in parallel to the primary driver unit 18. The secondary driver unit 20 is configured as an integrated electronic circuit. The secondary driver unit 20 is configured as a half bridge driver and/or gate driver, in the present case in particular a triple half bridge driver. The secondary driver unit 20 is provided in order to actuate at least one of the circuit breakers 22, in particular the same circuit breaker 22 as the primary driver unit 18, and in particular to provide a control voltage and/or a control current for the at least one circuit breaker 22. In the present case, the secondary driver unit 20 is provided by way of example to control all the circuit breakers 22 of the power electronics 16.

The secondary driver unit 20 together with the secondary computing unit 30 is provided at least in the fault operating state for actuating the power electronics 16. The secondary driver unit 20, in the normal operating state, is in a purely passive mode of operation and/or a standby mode of operation and is provided solely in the fault operating state for actuating the power electronics 16. In the present case, the secondary driver unit 20 is provided in order to replace the primary driver unit 18 in the fault operating state and to actuate the power electronics 16 and consequently to take control of the operation of the electric motor 12. The secondary driver unit 20 is also provided in order to use at least partially the same and/or identical, in particular existing, assemblies and connection lines so as to actuate the power electronics 16 and to actuate the same circuit breakers 22.

In the present case, the primary driver unit 18 and the secondary driver unit 20 are thus connected in parallel and provided in order to actuate the same power electronics 16, wherein the primary driver unit 18 is in the normal operating state and the secondary driver unit 20 is in the fault operating state.

Figure 3:
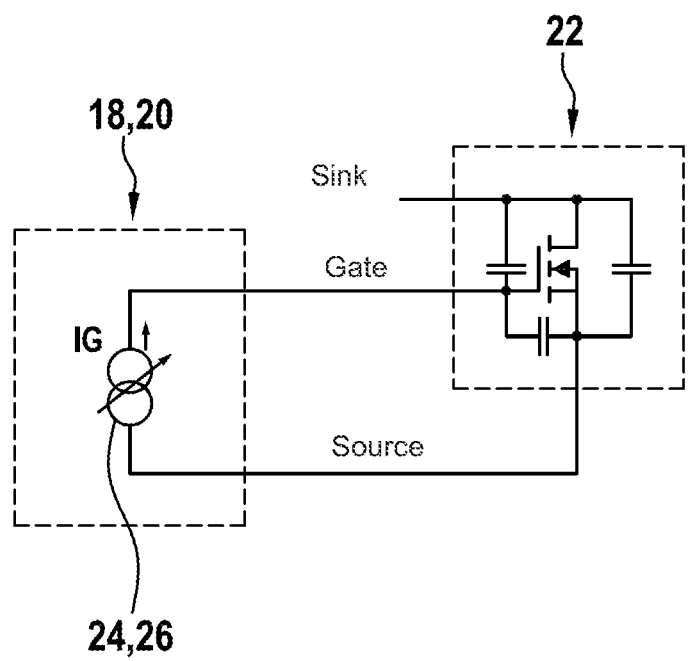

To control a switching state of the at least one circuit breaker 22, the primary driver unit 18 and the secondary driver unit 20 each have an integrated power source 24, 26 with an adjustable current (see also FIG. 3). In the present case, the power sources 24, 26 are used in order to generate a gate source voltage for actuating the circuit breaker 22. The power sources 24, 26 are provided in order to provide a positive current value in order to switch on and/or close the at least one circuit breaker 22, and a negative current value in order to switch off and/or open the at least one circuit breaker 22.

In the normal operating state, an absolute value of the power source 24 of the secondary driver unit 20 is set to a first value that is below a first limit value, and an absolute value of the further power source 26 of the primary driver unit 18 is set to a second value that is above a second limit value. The first limit value is at most 0.1 mA, while the second limit value is at least 500 mA. The limit values are related to the peak currents. With the limits used, it is achieved that in the normal operating state the primary driver unit 18 is active and the secondary driver unit 20 is passive and/or inactive.

In the fault operating state, the secondary driver unit 20 is transitioned to an active state by changing the amperage of the power source 24 of the secondary driver unit 20, while the primary driver unit 18 is disabled or is transitioned to a passive and/or inactive state by changing the amperage of the further power source 26. In the present case, an activity state of the primary driver unit 18 and the secondary driver unit 20 can thus be controlled by means of the respective current. Accordingly, in the fault operating state, an absolute value of the power source 24 of the secondary driver unit 20 is set to the second value, while an absolute value of the further power source 26 of the primary driver unit 18 can be set to the first value. However, in principle, the values of the power sources could also differ from one another in the normal operating state and/or the fault operating state.

To switch between the primary driver unit 18 and the secondary driver unit 20, the control device 10 further comprises a switching logic 32. The switching logic 32 is electrically connected to the primary computing unit 28 and the secondary computing unit 30. The switching logic 32 is also electrically connected to the primary driver unit 18 and the secondary driver unit 20. The switching logic 32 is configured as a discrete circuit. The switching logic 32 is provided in order to provide at least one control signal 38, 40 for enabling operation of the primary driver unit 18 or the secondary driver unit 20 as a function of a signal 34 of the primary computing unit 28 that is in particular different than the primary actuation signal 60 and a signal 36 of the secondary computing unit 30 that is in particular different than the secondary actuation signal 62. In the present case, the switching logic 32 is provided in order to provide a separate control signal 38, 40 for each driver unit 18, 20. In addition, the switching logic 32 is provided in order to prevent simultaneous operation of the primary driver unit 18 and the secondary driver unit 20. In principle, however, a switching logic could also be provided in order to only provide a single control signal for both driver units. Furthermore, a switching logic could also be configured as an integrated circuit or integrated into at least one of the driver units.

In the present case, in order to increase operational safety, the control device 10 also comprises a primary watchdog unit 46 and a secondary watchdog unit 48 configured redundantly to the primary watchdog unit 46. The primary watchdog unit 46 is associated with the primary computing unit 28 and/or the primary driver unit 18. In addition, the primary watchdog unit 46 is electrically connected to the switching logic 32. The secondary watchdog unit 48 is associated with the secondary computing unit 30 and/or the secondary driver unit 20. In addition, the secondary watchdog unit 48 is electrically connected to the switching logic 32. In principle, a control device could also comprise exactly one watchdog unit. It is also contemplated to completely omit a watchdog unit.

In the present case, the switching logic 32 is provided in order to account for a primary monitoring signal 42 of the primary watchdog unit 46 and a secondary monitoring signal 44 of the secondary watchdog unit 48 when generating the control signals 38, 40.

In this case, for the primary driver unit 18, one of the following logics is true for the release, wherein the release is carried out with logical 1:

EN_IG1=1, when EN_1=1 and WD_1=1 and EN_IG2=0
or
EN_IG1=1, when EN_1=1 and WD_1=1 and (EN_2=0 or WD_2=0)

Here, EN_IG1 corresponds to the control signal 38 for the primary driver unit 18, EN_1 corresponds to the signal 34 of the primary computing unit 28, EN_2 corresponds to the further signal 36 of the secondary computing unit 30, WD_1 corresponds to the primary monitoring signal 42 of the primary watchdog unit 46, EN_IG2 corresponds to the further control signal 40 for the secondary driver unit 20, and WD_2 corresponds to the secondary monitoring signal 44 of the secondary watchdog unit 48.

For the secondary driver unit 20, on the other hand, one of the following logics is true for the release, wherein the release is in turn carried out with logical 1:

EN_IG2=1, when EN_2=1 and WD_2=1 and EN_IG1=0
or
EN_IG2=1, when EN_2=1 and WD_2=1 and (EN_1=0 or WD_1=0)

Here, EN_IG2 corresponds to the further control signal 40 for the secondary driver unit 20, EN_1 corresponds to the signal 34 of the primary computing unit 28, EN_2 corresponds to the further signal 36 of the secondary computing unit 30, WD_2 corresponds to the secondary monitoring signal 44 of the secondary watchdog unit 48, EN_IG1 corresponds to the control signal 38 for the primary driver unit 18, and WD_1 corresponds to the primary monitoring signal 42 of the primary watchdog unit 46.

Figure 4:
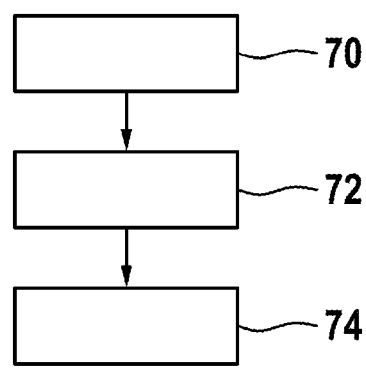

Finally, FIG. 4 shows an exemplary flow diagram with main method steps of an exemplary method for operating the electric motor 12 by means of the control device 10.

A method step 70 corresponds to the normal operating state. The primary driver unit 18 is provided together with the primary computing unit 28 for actuating the power electronics 16 and is thus in the active state. For this purpose, the absolute value of the further power source 26 of the primary driver unit 18 is set to the second value, which is above the second limit value. The secondary driver unit 20, on the other hand, is in a passive and/or inactive state. For this purpose, the absolute value of the power source 24 of the secondary driver unit 20 is set to the first value, which is below the first limit value.

In a method step 72, for example, by means of the primary computing unit 28, the secondary computing unit 30, the primary watchdog unit 46, and/or the secondary watchdog unit 48, a malfunction and/or a failure of the primary driver unit 18 is determined. The malfunction and/or failure of primary driver unit 18 can be associated with a malfunction and/or failure of primary driver unit 18 itself and/or an assembly cooperating with primary driver unit 18, such as primary computing unit 28, primary watchdog unit 46, a portion of switching logic 32, and/or a power supply. As a result, the primary driver unit 18 is replaced by the secondary driver unit 20. For this purpose, the primary driver unit 18 is deactivated by the control signal 38 of the switching logic 32 and a related change in the current of the further power source 26, and the secondary driver unit 20 is activated by the further control signal 40 of the switching logic 32 and a related change in the current of the power source 24. For this purpose, the absolute value of the power source 24 of the secondary driver unit 20 is set to the second value, which is above the second limit value.

A method step 74 corresponds to the fault operating state. The secondary driver unit 20 is provided together with the secondary computing unit 30 for actuating the power electronics 16 and is thus in the active state. For this purpose, the absolute value of the power source 24 of the secondary driver unit 20 is set to the second value, which is above the second limit value. The primary driver unit 18, on the other hand, is in a passive and/or inactive state. In this case, an alert can also be generated, for example by means of the secondary computing unit 30, and displayed to an occupant by means of corresponding output means (not shown).

The exemplary flowchart in FIG. 4 is merely intended to describe, by way of example, a method for operating the electric motor 12 by means of the control device 10. Individual method steps can in particular also vary, or additional method steps can be added. For example, a separate monitoring unit can also be used in order to determine a malfunction and/or a failure of the primary driver unit 18. In addition, it is contemplated to omit a watchdog unit.

What is claimed is:

1. A control device for operating an electric motor comprising:
    power electronics including at least one switch;
    a primary driver unit configured to actuate the power electronics in a normal operating state; and
    a secondary driver unit connected in parallel to the primary driver unit and configured to actuate the power electronics in at least one fault operating state in which a malfunction and/or failure of the primary driver unit occurs, the secondary driver unit including a power source, the secondary driver unit being configured to actuate a switching state of the at least one switch by providing a current from the power source to a control terminal of the at least one switch, a current strength of the current provided from the power source being adjustable by the secondary driver unit,
    wherein, in the normal operating state, the secondary driver unit is configured to adjust the current from the power source such that an absolute value of the current provided from the power source is set to a first value which is below a first limit value, and
    wherein, in the at least one fault operating state, the secondary driver unit is configured to adjust the current from the power source such that the absolute value of the current provided from the power source is set to a second value which is above a second limit value, the second limit value being greater than the first limit value.

2. The control device according to claim 1, wherein the secondary driver unit is configured to provide the current from the power source with (i) a positive current value for switching on and/or closing the at least one switch, and (ii) a negative current value for switching off and/or opening the at least one switch.

3. The control device according to claim 1, wherein the first limit value is at most 10 mA and the second limit value is at least 100 mA.

4. The control device according to claim 1, wherein the primary driver unit includes a further power source, the primary driver unit being configured to actuate the switching state of the at least one switch by providing a further current from the further power source to the control terminal of the at least one switch, a current strength of the further current provided from the further power source being adjustable by the primary driver unit.

5. The control device according to claim 1, further comprising:
    a primary computing unit configured to operate the primary driver unit;
    a secondary computing unit configured to operate the secondary driver unit; and
    a switching logic electrically connected to the primary driver unit and the secondary driver unit and configured to generate at least one control signal for enabling operation of the primary driver unit or the secondary driver unit as a function of a signal of the primary computing unit and a signal of the secondary computing unit.

6. The control device according to claim 5, wherein the switching logic is configured to prevent simultaneous operation of the primary driver unit and the secondary driver unit.

7. The control device according to claim 5, wherein the switching logic is configured to account for at least one monitoring signal of a watchdog unit when generating the at least one control signal.

8. The control device according to claim 5, wherein the switching logic is configured as a discrete circuit.

9. An actuator assembly having an electric motor and a control device, according to claim 1, operably connected to the electric motor.

10. A steering system having at least one actuator assembly according to claim 9.

11. A method for operating an electric motor using a control device, the method comprising:

in a normal operating state, actuating power electronics using a primary driver unit, the power electronics including at least one switch;

in at least one fault operating state in which a malfunction and/or failure of the primary driver unit occurs, actuating the power electronics using a secondary driver unit connected in parallel to the primary driver unit, the secondary driver unit including a power source, the secondary driver unit being configured to actuate a switching state of the at least one switch by providing a current from the power source to a control terminal of the at least one switch, a current strength of the current provided from the power source being adjustable by the secondary driver unit; and setting, with the secondary driver unit, an absolute value of the current provided by the power source in the normal operating state to a first value which is below a first limit value; and setting, with the secondary driver unit, the absolute value of the current provided by the power source in the at least one fault operating state to a second value which is above a second limit value, the second limit value being greater than the first limit value.

\* \* \* \* \*